US006791914B1

United States Patent
Marchant

(10) Patent No.: US 6,791,914 B1
(45) Date of Patent: Sep. 14, 2004

(54) PREFORMATTED GUIDE TRACKS AND CO-WRITTEN CONTROL TRACKS FOR MULTICHANNEL OPTICAL RECORDING

(75) Inventor: Alan B. Marchant, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 765 days.

(21) Appl. No.: 09/650,066

(22) Filed: Aug. 29, 2000

(51) Int. Cl.[7] ............................................. G11B 7/00
(52) U.S. Cl. ............................... 369/44.26; 369/275.04
(58) Field of Search ........................... 369/30.12, 44.11, 369/44.13, 44.18, 44.26, 44.28, 275.1, 275.4, 97, 275.3, 44.29, 44.35, 124.02

(56) References Cited

U.S. PATENT DOCUMENTS

| | | | | |
|---|---|---|---|---|
| 4,507,763 A | * | 3/1985 | Kato ........................ | 369/44.26 |
| 4,727,528 A | * | 2/1988 | Wyland .................... | 369/30.15 |
| 4,769,802 A | * | 9/1988 | Tatsduguchi ............. | 369/44.26 |
| 4,803,677 A | * | 2/1989 | Yamaguchi et al. ...... | 369/44.26 |
| 4,818,852 A | * | 4/1989 | Haddock et al. ........... | 235/488 |
| 4,884,260 A | | 11/1989 | Bouldin et al. | |
| 5,053,610 A | | 10/1991 | Horie | |
| 5,561,643 A | * | 10/1996 | Yamazaki et al. ........ | 369/44.29 |
| 5,774,433 A | * | 6/1998 | Rokutan ................... | 369/44.28 |
| 5,989,671 A | | 11/1999 | Nakayama et al. | |

OTHER PUBLICATIONS

Optical Recording A Technical Overview, Alan Marchant, 1990, p. 172.

\* cited by examiner

*Primary Examiner*—Thang V. Tran
*Assistant Examiner*—Bach Vuong
(74) *Attorney, Agent, or Firm*—Raymond L. Owens

(57) ABSTRACT

A method for multi-track optical data recording comprising the steps of providing an optical recording medium that includes a plurality of parallel, preformatted guide tracks, with sufficient space between adjacent guide tracks for recording a plurality of data tracks; providing relative motion between the optical recording medium and an optical head in a direction generally parallel to the guide tracks; imaging a guide track onto a detector array disposed relative to the optical recording medium; and generating a first tracking error signal representing the cross-track displacement of the guide track relative to the optical head. The method further comprises driving a closed-loop servo system to reduce the residual tracking runout of the guide track and simultaneously recording a band of data tracks in the unpreformatted space adjacent to the guide track and one or more control tracks parallel to the data tracks.

9 Claims, 3 Drawing Sheets

(Prior Art)

PREFORMATTED GUIDE TRACKS AND CO-WRITTEN CONTROL TRACKS FOR MULTICHANNEL OPTICAL RECORDING

FIELD OF THE INVENTION

The present invention relates to simultaneously writing multiple data tracks on an optical medium such as an optical tape.

BACKGROUND OF THE INVENTION

The high capacity of optical recording media results from the small size and spacing of marks recorded in the data tracks and from the close spacing of tracks next to each other. In order to accurately record and read closely-spaced tracks, optical recording systems rely on high-precision servo systems. Preformatted patterns on the media surface are used to generate some of the required servo positioning signals. For example, replicated grooves or guide tracks in an optical disk substrate are commonly used to generate tracking signals (see *Optical Recording, a Technical Overview*, Alan Marchant, 1990, p. 172). The optical head includes a closed-loop servo system that follows the guide track while recording or reading data tracks disposed on the guide track or in an adjacent unmarked area. One guide track is provided for each possible data track.

Preformatted guide tracks are also useful for registering recorded marks on other types of optical media, e.g. optical tape (U.S. Pat. Nos. 4,884,260 and 5,989,671) and optical card (U.S. Pat. No. 5,053,610). Preformatted guide tracks provide a means for reducing cross-track run-out during optical data recording. But because of residual run-out, the preformatted guide tracks do not define the optimal path for tracking recorded data. Furthermore, prior art methods for servo control functions require format characteristics that reduce data capacity, especially when implemented for multi-track optical recording.

SUMMARY OF THE INVENTION

It is an object of this invention to improve track-following accuracy for data readout in an optical recording system that simultaneously records and reads multiple data tracks. It is a further object of this invention reduce the fraction of the media area dedicated to servo-control information on an optical recording medium used for simultaneously recording and reading multiple data tracks.

This object is achieved by a method for multi-track optical data recording, comprising the steps of:

a) providing an optical recording medium that includes a plurality of parallel, preformatted guide tracks, with sufficient space between adjacent guide tracks for recording a plurality of data tracks;

b) providing relative motion between the optical recording medium and an optical head in a direction generally parallel to the guide tracks;

c) imaging a guide track onto a detector array disposed relative to the optical recording medium, generating a first tracking error signal representing the cross-track displacement of the guide track relative to the optical head, and driving a closed-loop servo system to reduce the first tracking error signal; and d) simultaneously recording a band of data tracks in the unpreformatted space adjacent to the guide track and one or more control tracks parallel to the data tracks.

ADVANTAGES

The present invention has as an advantage that neighboring bands of data tracks recorded at different times are positioned with a high degree of positional accuracy and parallelism relative to the prior art. Increased positional accuracy and parallelism permits the data bands to be recorded closer together with less unused guard space, thus increasing the storage capacity of the recording medium.

The present invention further provides accurate servo signals associated with track position and data timing that are independently optimized for writing and reading data. Independent optimization of the servo functions assures optimum performance of the recording system in both operational modes.

A feature of the present invention is that patterns required for servo signals, clock synchronization, data addresses, and other format overhead may be concentrated on the medium and kept separate from data tracks, permitting higher speed recording by the data channels.

DETAILED DESCRIPTION OF THE INVENTION

Figure 1:
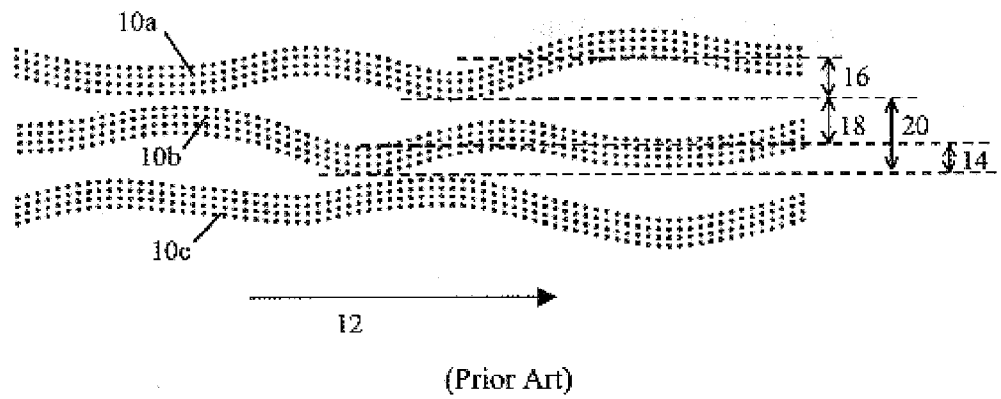
FIG. 1 illustrates multi-track optical recording without a preformat pattern.

A preformatted guide track pattern is important for multi-track optical data recording. FIG. 1 illustrates multi-track optical recording according to the prior art without a preformat pattern. Bands of data tracks 10*a*–*c* are recorded on an optical recording medium that is scanned in a longitudinal direction 12. The width of each data band 14 substantially constant. However, instabilities in the recording system, media, and transport create cross-track run-out 16, which is reflected in non-straightness of the recorded data bands. In order to prevent overlap between neighboring data bands, a guard space 18 must be provided next to each data band and the guard space must be at least as great as the maximum run-out. The resulting cross-track pitch 20 of the data bands is approximately equal to the width of the data band plus the guard space. Thus the data capacity of the optical recording medium can be increased by reducing the cross-track run-out.

Figure 2:
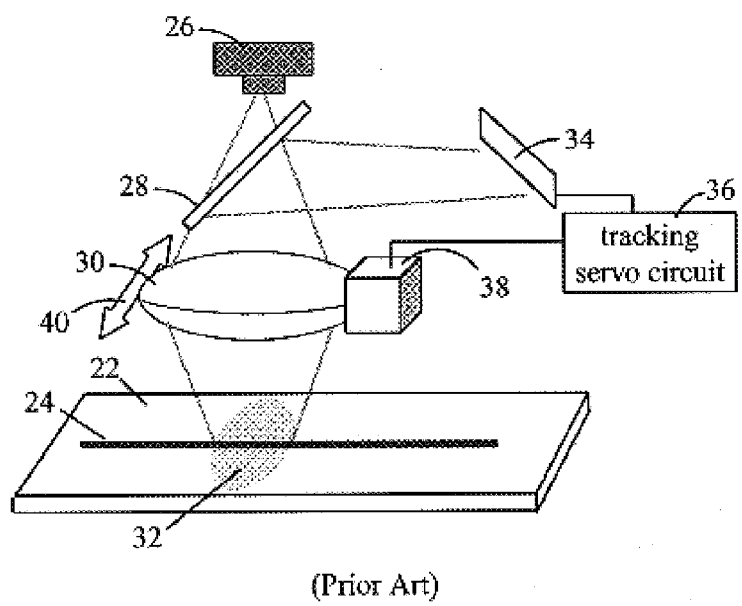
FIG. 2 illustrates an optical recording system that uses a guide track to reduce the cross-track run-out.

FIG. 2 includes a closed-loop servo system that uses a guide track to reduce the tracking error, or residual cross-track run-out, according to prior art methods. An optical recording medium 22 includes a preformatted guide track 24. Light from a light source 26 passes through a beam splitter 28 and is focused by an objective lens 30 to form an focused spot 32 that illuminates the guide track. The objective lens 30 is parts of the servo system and is adjustable to reduce the cross-track run-out error. An image of the focused spot is relayed by the beam splitter onto a photodetector device 34. Signals from the photodetector device are evaluated by a tracking servo circuit 36 that estimates the tracking error, or offset of the guide track relative to the focused spot. The tracking servo circuit sends a tracking error signal to a tracking actuator 38 that effects cross-track motion 40 of the objective lens 30 so that the focused spot 32 remains at a fixed cross-track position relative to the guide track. This system constitutes a closed-loop servo system that maintains the objective lens in a fixed orientation relative to the guide track and reduces the residual cross-track runout of the medium relative to the system. The closed-loop tracking servo may alternatively include an actuator that moves the optical head or the medium, instead of the objective lens.

Figure 3:
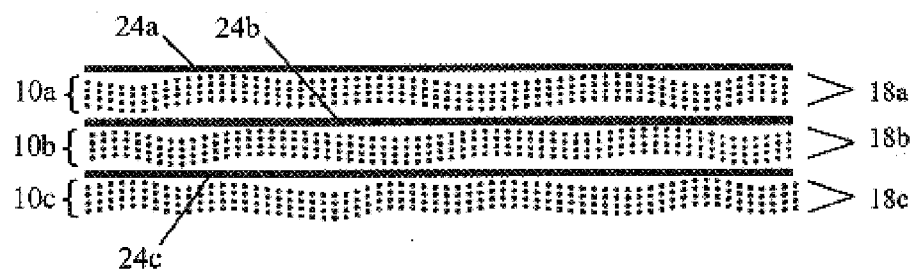
FIG. 3 shows an optical recording format with guide tracks that provide tracking control for multi-track recording.

It is known that one preformat track can be used to orient a track group consisting of multiple data tracks. U.S. Pat. No. 4,805,162 discloses the use of preformat tracks, each of which is used for coarse tracking of a neighboring group of tracks. FIG. 3 shows an optical recording format with prior art guide tracks that provide tracking control for multi-track recording. An optical recording medium includes a pattern of longitudinal preformatted guide tracks 24*a–c* with enough spacing between neighboring guide tracks for multiple parallel data tracks. A band of data tracks is associated with each guide track, e.g. data bands 10*a–c* are associated with guide-tracks 24*a–c*, respectively. The data tracks that comprise a data band are recorded simultaneously while a closed-loop servo system follows the relative motion of the associated guide track as described in FIG. 2. The spacing between guide tracks must be larger than the width of the data bands in order to accommodate residual cross-track run-out caused by limitations on the bandwidth of the tracking servo or non-parallelism of the guide tracks. Associated with guide tracks 24*a–c* are guard spaces 18*a–c* that are at least as large as the residual cross-track run-out.

Figure 4:
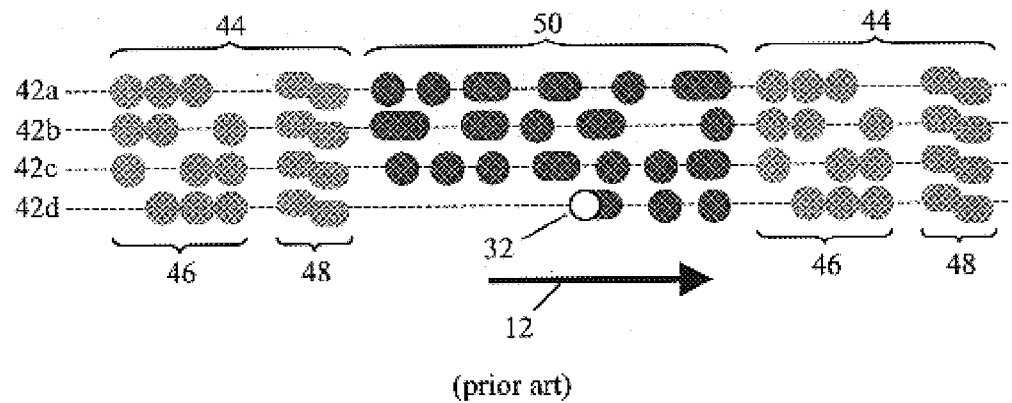
FIG. 4 illustrates additional features of preformatted guide tracks from the prior art.

In addition to providing tracking information, preformat patterns are also useful for regenerating data clock and address information to more accurately record, access, and decode the data pattern in the in-track direction. Several features of preformatted guide tracks from the prior art are illustrated in FIG. 4. An optical recording format includes preformatted guide track segments, 44, disposed on formatted data tracks 42*a–d*. The guide track segments are further organized to form address patterns 46 that identify specific tracks and/or sectors, and servo control patterns 48 that provide a precise visible indication of the track center and data clock phase. The servo control patterns include marks with in-track and cross-track positions that may be precisely measured by an optical sensor. To enhance detectability, the servo control patterns may include small-amplitude cross-track offsets (shown in FIG. 4.). The regeneration of data clock information may be enhanced by the presence of periodic patterns of marks, spaces, or mark width having a spatial period commensurate with the data clock. Address information is regenerated by decoding address patterns including sequences of marks and spaces that digitally encode the address.

FIG. 4 further illustrates a prior art sampled-servo preformat (see Marchant, p. 266 ). According to this concept, preformat marks on each track are organized as discrete groups, interleaved with unpreformatted spaces. During data recording, a focused spot of light 32 is formed on the media surface and the medium is scanned relative to the spot in a direction 12 parallel to the preformatted guide track segments 44. As the focused spot traverses a region of preformatted marks, its intensity is held constant to reproduce tracking control information used by the closed-loop tracking servo as explained in FIG. 3. The focuses spot also reproduces other system control information such as timing and address information. As the focused spot traverses an interleaved unpreformatted region, the spot intensity is modulated to record data marks 50. During data readout, the focused spot is maintained at constant intensity for the entire scan to generate tracking and control information from the preformatted marks and to reproduce user data from the recorded marks.

In order for a sampled-servo preformat to provide effective tracking control, many tracking control patterns must be provided on each track. The system must encounter these patterns and update the tracking error signal at a frequency well in excess of the servo bandwidth, e.g. 1 kHz or higher. The sampled servo track concept is disclosed in U.S. Pat. No. 4,363,116. This patent also discloses the combined use of a sampled servo for multi-track data recording (c.f. FIGS. 14–16) by which one intermittent preformat track provides control for simultaneously recording data on multiple unformatted tracks and in the gaps of the servo track.

Figure 5:
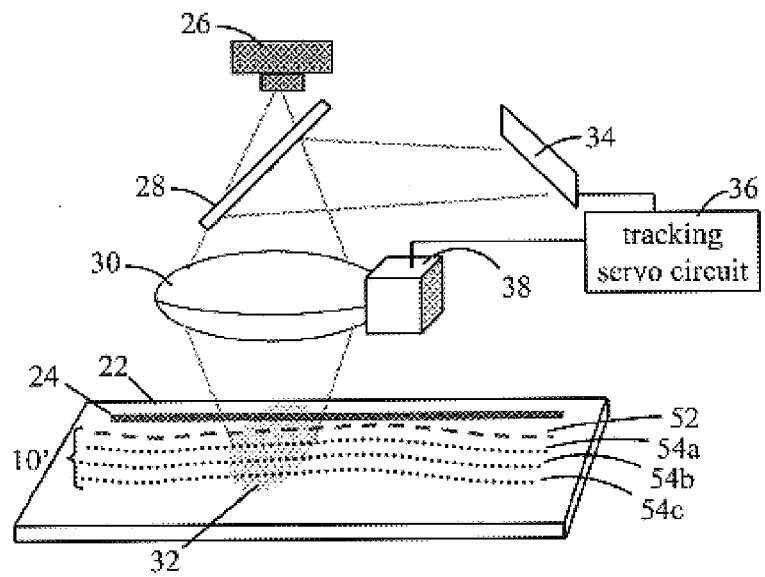
FIG. 5 shows an improved tracking control system according to the present invention for multi-track writing and reading on an optical medium.

FIG. 5 illustrates an improved method for multi-track optical recording according to the present invention. In an optical recording system, illumination from a light source 26 is focused by an objective lens 30 to form a focused spot 32 on the surface of an optical recording medium 22 that includes a preformatted guide track 24. During data recording, an image of the focused spot is focused through the objective lens and relayed by a beam splitter 28 onto a photodetector device 34. Signals from the photodetector device are processed by a tracking servo circuit 36 to produce a tracking error signal that is responsive to the cross-track position of an illuminated guide track relative to the focused spot. In response to the tracking error signal, a tracking actuator 38 causes the objective lens to move in the cross-track direction to generally follow the relative motion of the guide track while the a data band 10' including a plurality of data tracks 54*a–c* is recorded in the unpreformatted region adjacent to the guide track. A control track 52 is also recorded adjacent to and simultaneously with the data band.

Multi-track readout according to the present invention may also be understood by reference to FIG. 5. During data readout, the focused spot illuminates the data band and an image of the control track is formed on the photodetector device. Signals from the photodetector device are processed by the tracking servo circuit to produce a tracking error signal that is responsive to the cross-track position of the control track relative to the focused spot. In response to the tracking error signal, the tracking actuator causes the objective lens to move in the cross-track direction to generally follow the relative motion of a control track, while information encoded on the data tracks with which the control track was recorded is recovered by the photodetector device or another sensor. Alternatively, the tracking actuator may be controlled by a tracking error signal derived from the preformatted guide track, as described previously for multi-track recording, and the error signal from the control track may drive a separate fine tracking subsystem that corrects or improve the recovery of information from the data tracks. The control track co-recorded as part of the data band serves to reduce the residual cross-track run-out of the data tracks during readout, because the tracking error signal is based on a control track pattern that runs exactly parallel to the data tracks, rather than a preformatted guide track that does not perfectly match the path of the recorded data tracks.

Figure 6:
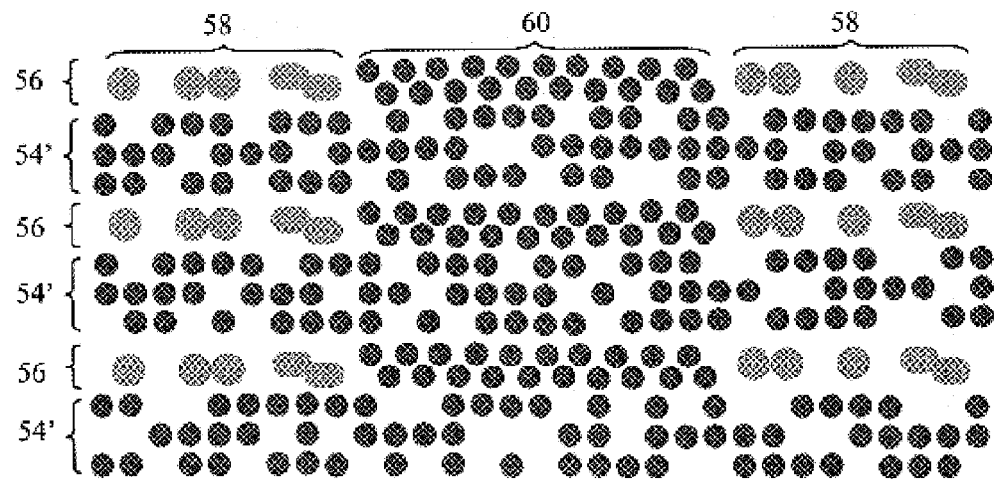
FIG. 6 illustrates a data band format in accordance with the present invention.

To further improve tracking accuracy and drive performance, a recording format with preformatted guide tracks and the co-recorded control tracks according to the present invention may include additional format features such as special track sensing patterns, address patterns, clock-generating features, and clock synchronization patterns as shown in FIG. 6. The servo control patterns are formatted into interleaved guide tracks and control tracks 56. The servo control patterns may include modulation with respect to cross-track position, mark length and spacing, mark width, or other visible mark characteristics. A data clock signal may be readily regenerated if the servo control patterns include regular modulation having a spatial period commensurate with the data clock. Cross-track position modulation of a guide track, if included in the servo control patterns, should have an amplitude less than the guide track width.

Each interleaved guide track and control track includes a preformatted guide track segmented into sections 58 that are disposed at an in-track spatial frequency much higher than displacements associated with cross-track runout. The guide track segments may further include patterns defining longitudinal addresses along the track. One or more segmented control track is written by the recording system in the gaps between preformatted guide track segments at substantially the same cross-track location. The control track segments may further include information-bearing patterns defining longitudinal and cross-track addresses of the associated data band.

While the system records a band of data tracks 54', tracking servo control is based on tracking error signals detected from the guide track sections. Simultaneous with recording of the data band, control track sections 60 are recorded between consecutive sections of the neighboring guide tracks. During subsequent readout of information from the data band, tracking servo control is based on tracking error signals detected from the control track sections. The data tracks 54a–c may be dedicated to encoded user data with little overhead for format information or servo patterns. Interleaving of the guide tracks and control tracks reduces the fraction of media surface that is dedicated to format information, thus increasing the net storage capacity of the recording medium.

Figure 7:
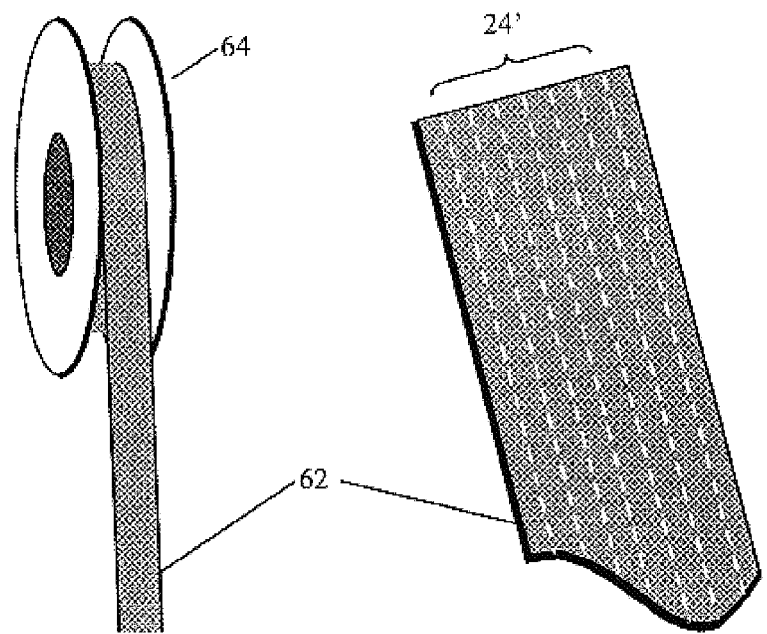
FIG. 7 shows an optical recording medium preformatted with guide tracks in accordance with the present invention.

Preformatted guide tracks may be provided through a media manufacturing process. FIG. 7 illustrates an optical tape media unit that is preformatted in accordance with the present invention. The media unit includes a strip of flexible optical tape 62 wound on a reel 64. A set of identical preformatted guide tracks 24' are disposed across the recording surface of the tape with a uniform pitch. The guide tracks are parallel to the length of the tape. The pitch between guide tracks is much larger than the width of an individual data track. Another form of optical medium preformatted in accordance with the present invention is an optical card with linear, parallel guide tracks spaced with a pitch much longer than the width of an individual data track.

The invention has been described in detail with particular reference to certain preferred embodiments thereof, but it will be understood that variations and modifications can be effected within the spirit and scope of the invention.

| PARTS LIST | | |
|---|---|---|
| 10a | data band | |
| 10b | data band | |
| 10c | data band | |
| 10' | data band | |
| 12 | longitudinal scan direction | |
| 14 | width of data band | |

| PARTS LIST -continued | | |
|---|---|---|
| 16 | cross-track run-out | |
| 18 | guard space | |
| 18a | guard space | |
| 18b | guard space | |
| 18c | guard space | |
| 20 | pitch of data bands | |
| 22 | optical recording medium | |
| 24 | preformatted guide track | |
| 24' | preformatted guide tracks | |
| 24a | preformatted guide track | |
| 24b | preformatted guide track | |
| 24c | preformatted guide track | |
| 26 | light source | |
| 28 | beam splitter | |
| 30 | objective lens | |
| 32 | focused spot | |
| 34 | photodetector device | |
| 36 | tracking servo circuit | |
| 38 | tracking actuator | |
| 40 | cross-track direction | |
| 42a | formatted data track | |
| 42b | formatted data track | |
| 42c | formatted data track | |
| 42d | formatted data track | |
| 44 | preformatted guide track segments | |
| 46 | address patterns | |
| 48 | servo control patterns | |
| 50 | data marks | |
| 52 | control track | |
| 54a | data track | |
| 54b | data track | |
| 54c | data track | |
| 54' | data tracks | |
| 56 | interleaved guide track and control tracks | |
| 58 | guide track sections | |
| 60 | control track sections | |
| 62 | optical tape | |
| 64 | optical tape reel. | |

What is claimed is:

1. A method for multi-track optical data recording, comprising the steps of:

a) providing an optical head and an optical recording medium that includes a plurality of parallel, preformatted guide tracks, with sufficient space between adjacent guide tracks for recording a plurality of data tracks;

b) providing relative motion between the optical recording medium and the optical head in a direction generally parallel to the guide tracks;

c) imaging a guide track onto a detector array disposed relative to the optical recording medium, generating a first tracking error signal representing the cross-track displacement of the guide track relative to the optical head, and driving a closed-loop servo system to reduce residual tracking runout of the guide track; and d) simultaneously recording a band of data tracks in the unpreformatted space adjacent to the guide track and one or more control tracks parallel to the data tracks.

2. The method of claim 1 wherein the closed-loop servo system includes a moveable objective lens, the position of which is adjusted to reduce the residual tracking runout.

3. The method of claim 1 in which the preformatted guide track further includes cross-track offsets of the guide track pattern with the offset amplitude less than the track width.

4. The method of claim 1 in which the preformatted guide track further includes periodic patterns of marks, spaces, or mark width having a spatial period commensurate with the data clock.

5. The method of claim 1 in which the preformatted guide track further includes address patterns including sequences of guide track marks and spaces that digitally information identifying the guide track or its longitudinal location along the guide track.

6. The method of claim 1 in which the guide track is segmented in the longitudinal direction and at least one control track is also segmented and interleaved with the guide track at substantially the same cross-track location.

7. The method of claim 1 in which all guide tracks have identical patterns and are disposed with a uniform cross-track spacing.

8. A preformatted optical recording medium comprising:
a) a plurality of parallel, segmented guide tracks;
b) sufficient unformatted space between adjacent guide tracks for recording of a plurality of data tracks; and
c) unformatted gaps between successive segments of each guide track having approximately the same lengths as the guide track segments.

9. The optical recording medium of claim 8 in which the medium is a flexible tape and the guide tracks are disposed longitudinally along the tape.

* * * * *